(12) United States Patent
Mugiraneza et al.

(10) Patent No.: US 10,732,779 B2
(45) Date of Patent: Aug. 4, 2020

(54) TOUCH PANEL INCLUDING PAD ELECTRODES AND A DRIVE/READOUT CIRCUIT, AND TOUCH DISPLAY INCLUDING SAME

(71) Applicant: Sharp Kabushiki Kaisha, Sakai, Osaka (JP)

(72) Inventors: Jean Mugiraneza, Sakai (JP); Yasuhiro Sugita, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/151,589

(22) Filed: Oct. 4, 2018

(65) Prior Publication Data
US 2019/0114007 A1    Apr. 18, 2019

(30) Foreign Application Priority Data

Oct. 13, 2017  (JP) .................................. 2017-199620

(51) Int. Cl.
   *G06F 3/044*    (2006.01)
   *G06F 3/041*    (2006.01)
(52) U.S. Cl.
   CPC ............ *G06F 3/044* (2013.01); *G06F 3/0412* (2013.01); *G06F 3/0416* (2013.01)
(58) Field of Classification Search
   CPC ....... G06F 3/044; G06F 3/0416; G06F 3/0412
   See application file for complete search history.

(56) References Cited

U.S. PATENT DOCUMENTS

| 5,841,078 | A | 11/1998 | Miller et al. |
| 9,105,255 | B2 | 8/2015 | Brown et al. |
| 9,250,735 | B2 | 2/2016 | Kim et al. |
| 9,830,025 | B2* | 11/2017 | Han .................. G06F 3/0412 |
| 2010/0001973 | A1 | 1/2010 | Hotelling et al. |
| 2014/0132559 | A1 | 5/2014 | Kim |
| 2015/0179122 | A1* | 6/2015 | Brown ................ G06F 3/0416 345/174 |
| 2016/0299599 | A1* | 10/2016 | Kang ..................... G06F 3/044 |
| 2016/0320886 | A1 | 11/2016 | Kim et al. |
| 2017/0185194 | A1* | 6/2017 | Kim ..................... G06F 3/0412 |
| 2018/0203540 | A1 | 7/2018 | Maguire et al. |
| 2019/0042016 | A1* | 2/2019 | Wang .................. G06F 3/0412 |

FOREIGN PATENT DOCUMENTS

| GB | 2542854 A | 4/2017 |
| WO | 2017/056900 A1 | 4/2017 |

OTHER PUBLICATIONS

Maguire, S.; "Active Matrix Touch Panel With Narrow Bezel"; U.S. Appl. No. 15/782,947, filed Oct. 13, 2017.
Maguire, S.; "Capacitive Touch Sensing with Conductivity Type Determination"; U.S. Appl. No. 15/782,964, filed Oct. 13, 2017.

* cited by examiner

*Primary Examiner* — Kwang-Su Yang
(74) *Attorney, Agent, or Firm* — Keating & Bennett, LLP

(57) ABSTRACT

A touch panel includes: a drive/readout circuit which measures, during a first measurement period, a self-capacitance between each of a plurality of pad electrodes and a touching object; and a readout circuit which measures, during a second measurement period, a mutual capacitance between a first portion of the plurality of pad electrodes and a second portion of the plurality of pad electrodes.

3 Claims, 12 Drawing Sheets

TOUCH PANEL INCLUDING PAD ELECTRODES AND A DRIVE/READOUT CIRCUIT, AND TOUCH DISPLAY INCLUDING SAME

This Nonprovisional application claims priority under 35 U.S.C. § 119 on Patent Application No. 2017-199620 filed in Japan on Oct. 13, 2017, the entire contents of which are hereby incorporated by reference.

TECHNICAL FIELD

The present invention relates to a capacitive touch panel, a touch panel controller, and a touch display.

BACKGROUND ART

Displays of recent mobile devices and personal computers have an integrated touch panel which allows a direct touch with a finger or a pen.

Self-capacitance touch panels (Patent Literatures 1 and 2) and mutual capacitance touch panels (Patent Literature 3) are known as conventional capacitive touch panels.

Self-capacitance touch panels detect a touch location of a touching object by measuring a self-capacitance between (i) each of a plurality of electrodes and (ii) the touching object. Mutual capacitance touch panels, on the other hand, detect a touch location of a touching object by measuring a mutual capacitance between a drive electrode and a sense electrode.

In order to achieve thinner devices, a focus has been put on integrating touch panels into displays. Conventional capacitive touch panels are configured to detect a conductive object.

CITATION LIST

Patent Literature

[Patent Literature 1]
U.S. Patent Application Publication No. 2014/0132559 (May 15, 2014)
[Patent Literature 2]
Specification of U.S. Pat. No. 9,250,735 (Feb. 2, 2016)
[Patent Literature 3]
U.S. Patent Application Publication No. 2010/0001973 (Jan. 7, 2010)

SUMMARY OF INVENTION

Technical Problem

However, with a self-capacitance method, it is possible to detect only a touch with a conductive object; a touch with a non-conductive object cannot be detected. On the other hand, with a mutual capacitance method, the manner in which capacitance changes differs between touches with conductive objects and touches with non-conductive objects. Unfortunately, though, since signal levels based on such changes are low, it is difficult to detect such signal levels.

An object of an aspect of the present invention is to provide a touch panel, a touch panel controller, and a touch display, each of which is capable of determining a conductivity characteristic of a touching object.

Solution to Problem

In order to solve the above problem, a touch panel in accordance with an aspect of the present invention includes: a plurality of pad electrodes arranged in the form of a matrix; a self-capacitance measuring circuit which measures, during a first measurement period, a self-capacitance between each of the plurality of pad electrodes and a touching object, in order to detect a touch location at which the touching object is touching one or more of the plurality of pad electrodes; and a mutual capacitance measuring circuit which measures, during a second measurement period, a mutual capacitance between a first portion of the plurality of pad electrodes and a second portion of the plurality of pad electrodes, in order to determine at least one characteristic of the touching object which is touching one or more of the plurality of pad electrodes.

In order to solve the above problem, a touch panel in accordance with an aspect of the present invention includes: a plurality of pad electrodes arranged in the form of a matrix; and a self-capacitance measuring circuit which measures, during a first measurement period and a second measurement period, a self-capacitance between each of the plurality of pad electrodes and a touching object, in order to detect a touch location at which the touching object is touching one or more of the plurality of pad electrodes, the self-capacitance measuring circuit including: a drive circuit which supplies, during the first measurement period, a first electrification signal to each of the plurality of pad electrodes; and a readout circuit which reads out, during the first measurement period, a first electric charge signal from each of the plurality of pad electrodes to which the first electrification signal has been supplied by the drive circuit, the drive circuit supplying, during the second measurement period, (i) the first electrification signal to a first portion of the plurality of pad electrodes and (ii) a second electrification signal to a second portion of the plurality of pad electrodes which is adjacent to the first portion of the plurality of pad electrodes, the second electrification signal having a voltage which differs from that of the first electrification signal, the readout circuit reading out, during the second measurement period, (i) the first electric charge signal from the first portion of the plurality of pad electrodes to which the first electrification signal has been supplied and (ii) a second electric charge signal from the second portion of the plurality of pad electrodes to which the second electrification signal has been supplied.

In order to solve the above problem, a touch panel controller in accordance with an aspect of the present invention is a touch panel controller which controls a touch panel including a plurality of pad electrodes arranged in the form of a matrix, the touch panel controller including: a self-capacitance measuring circuit which measures, during a first measurement period, a self-capacitance between each of the plurality of pad electrodes and a touching object, in order to detect a touch location at which the touching object is touching one or more of the plurality of pad electrodes; and a mutual capacitance measuring circuit which measures, during a second measurement period, a mutual capacitance between a first portion of the plurality of pad electrodes and a second portion of the plurality of pad electrodes, in order to determine at least one characteristic of the touching object which is touching one or more of the plurality of pad electrodes.

In order to solve the above problem, another touch panel controller in accordance with an aspect of the present invention is a touch panel controller which controls a touch panel including a plurality of pad electrodes arranged in the form of a matrix, the touch panel controller including: a self-capacitance measuring circuit which measures, during a first measurement period and a second measurement period, a self-capacitance between each of the plurality of pad electrodes and a touching object, in order to detect a touch location at which the touching object is touching one or more of the plurality of pad electrodes, the self-capacitance measuring circuit including: a drive circuit which supplies, during the first measurement period, a first electrification signal to each of the plurality of pad electrodes; and a readout circuit which reads out, during the first measurement period, a first electric charge signal from each of the plurality of pad electrodes to which the first electrification signal has been supplied by the drive circuit, the drive circuit supplying, during the second measurement period, (i) the first electrification signal to a first portion of the plurality of pad electrodes and (ii) a second electrification signal to a second portion of the plurality of pad electrodes which is adjacent to the first portion of the plurality of pad electrodes, the second electrification signal having a voltage which differs from that of the first electrification signal, the readout circuit reading out, during the second measurement period, (i) the first electric charge signal from the first portion of the plurality of pad electrodes to which the first electrification signal has been supplied and (ii) a second electric charge signal from the second portion of the plurality of pad electrodes to which the second electrification signal has been supplied.

In order to solve the above problem, a touch display in accordance with an aspect of the present invention includes a touch panel in accordance with an aspect of the present invention.

Advantageous Effects of Invention

An aspect of the present invention makes it possible to provide a touch panel, a touch panel controller, and a touch display, each of which is capable of determining a conductivity characteristic of a touching object.

BRIEF DESCRIPTION OF DRAWINGS (a) of FIG. 1 is a circuit diagram illustrating the basic principle of a self-capacitance method for a touch panel. (b) of FIG. 1 is a circuit diagram illustrating the basic principle of a mutual capacitance method for a touch panel. (c) of FIG. 1 is a diagram for explaining how a detected capacitance changes in the self and mutual capacitance methods depending on the conductivity of a touching object.

Figure 12:
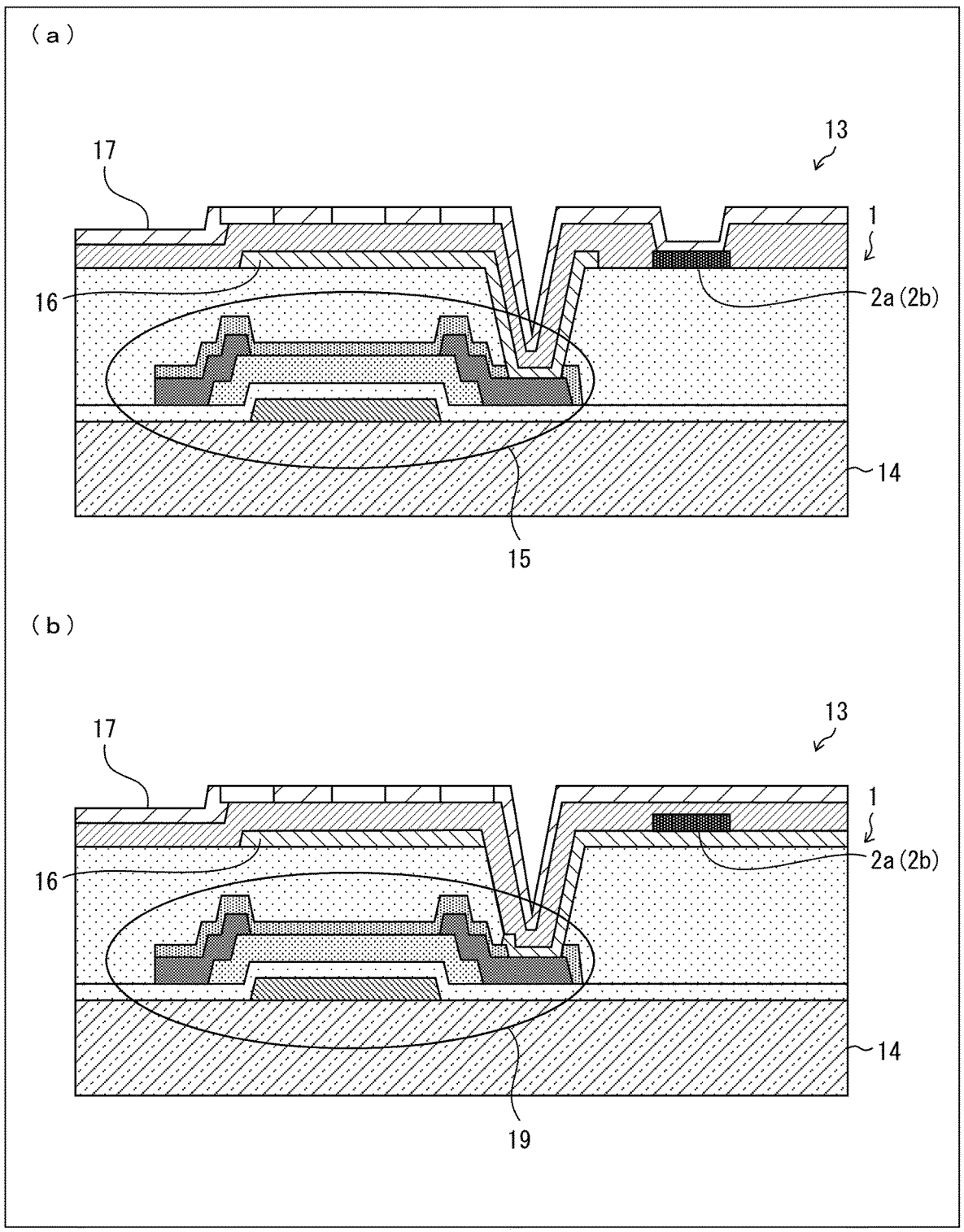

(a) of FIG. 12 is a cross-sectional diagram illustrating a touch display in accordance with Embodiment 4. (b) of FIG. 12 is another cross-sectional diagram illustrating the touch display.

DESCRIPTION OF EMBODIMENTS

Embodiment 1

Figure 1:
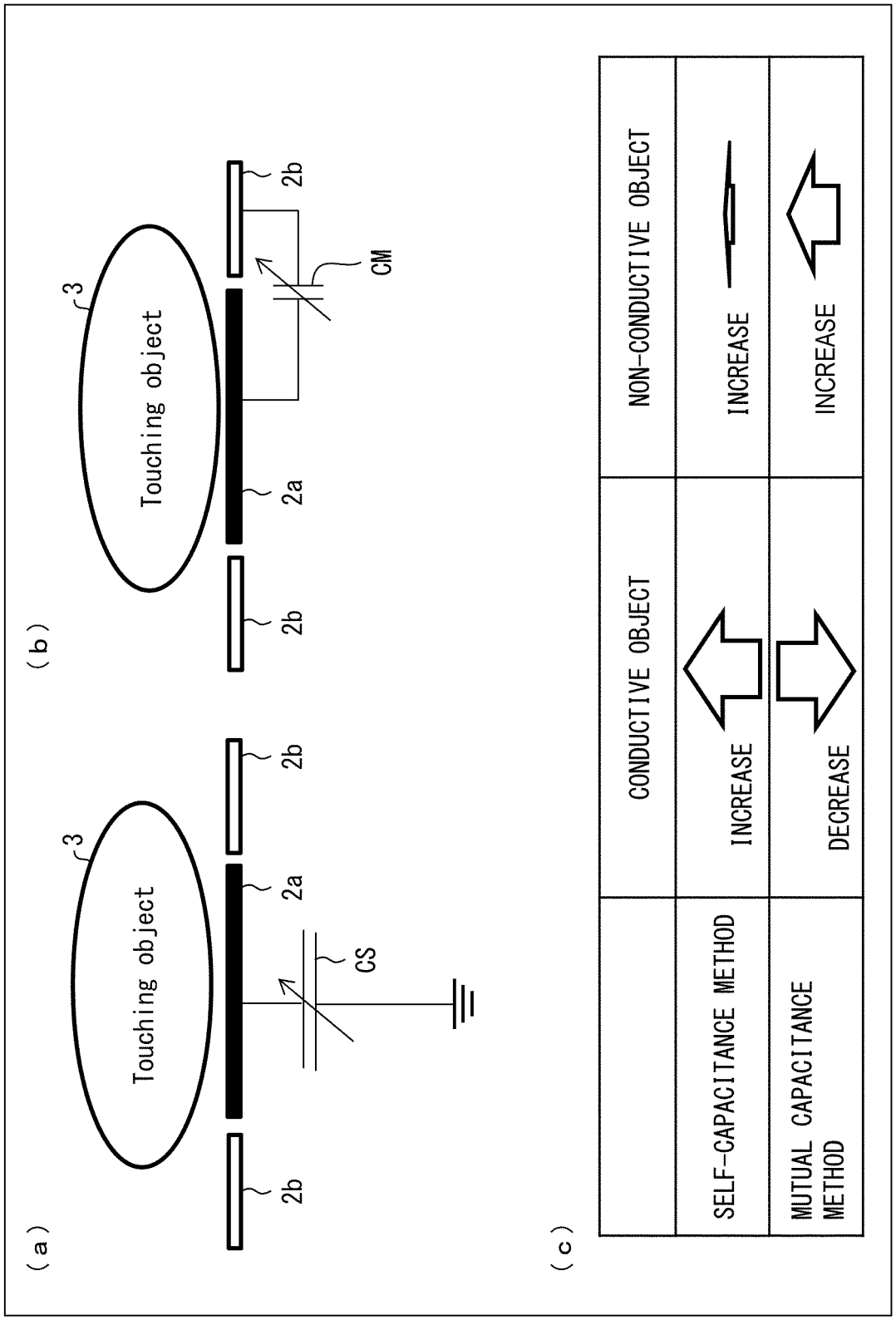

The following description will discuss an embodiment of the present invention in detail. (a) of FIG. 1 is a circuit diagram illustrating the basic principle of a self-capacitance method for a touch panel. (b) of FIG. 1 is a circuit diagram illustrating the basic principle of a mutual capacitance method for a touch panel. (c) of FIG. 1 is a diagram for explaining how a detected capacitance changes in the self and mutual capacitance methods depending on the conductivity of a touching object.

A touch panel has a pad electrode $2a$ and pad electrodes $2b$ adjacent to the pad electrode $2a$. These pad electrodes are arranged in the form of a matrix.

In the self-capacitance method, for example, a self-capacitance CS between the pad electrode $2a$ and a touching object 3 is measured, as illustrated in (a) of FIG. 1. In the mutual capacitance method, a mutual capacitance CM between the pad electrode $2a$ and the pad electrodes $2b$ is measured, as illustrated in (b) of FIG. 1.

As illustrated in (c) of FIG. 1, in the self-capacitance method, in a case where the touching object 3 which touches the pad electrode $2a$ is a conductive object, such as a human body part, the self-capacitance CS will increase. However, in a case where the touching object 3 is a non-conductive object such as water, the self-capacitance CS will only increase slightly.

On the other hand, in the mutual capacitance method, in a case where the touching object 3 which touches the pad electrode $2a$ is a conductive object, the mutual capacitance CM will decrease. Conversely, in a case where the touching object 3 is a non-conductive object, the mutual capacitance CM will increase.

Figure 2:
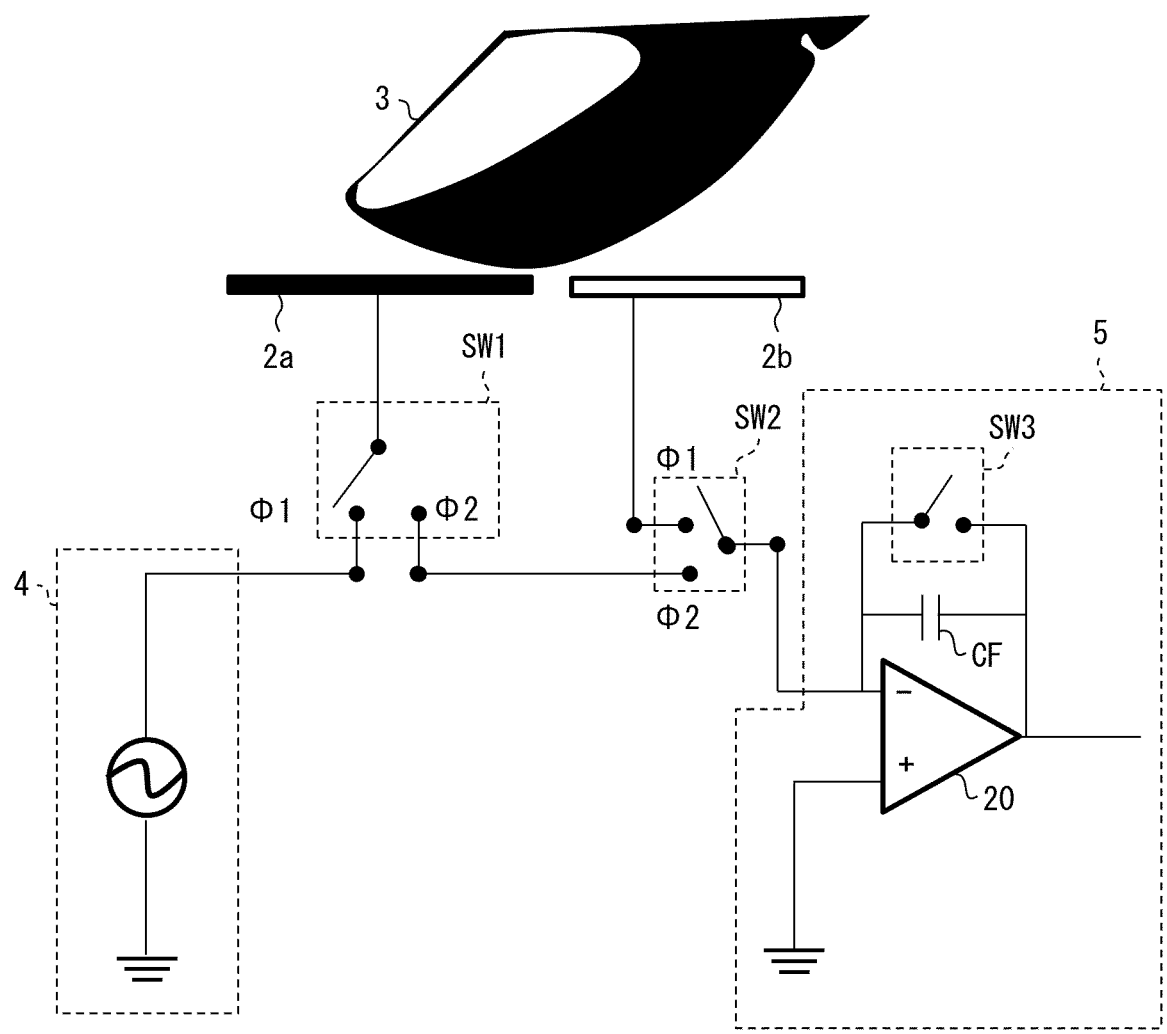
FIG. 2 is a circuit diagram for explaining a method of driving a touch panel in accordance with Embodiment 1.

FIG. 2 is a circuit diagram for explaining a method of driving a touch panel in accordance with Embodiment 1. The touch panel in accordance with Embodiment 1 is capable of detecting both a conductive object and a non-conductive object. The touch panel measures both a self-capacitance and a mutual capacitance. The self-capacitance which is measured is used for detecting a touch location. The results of the mutual capacitance measurement are used for determining a characteristic, such as conductivity, of a touching object. The results of the mutual capacitance measurement are also used for more preferable detection of a non-conductive object and a floating object.

The touch panel includes a drive circuit 4 (self-capacitance measuring circuit, mutual capacitance measuring circuit) for supplying an electrification signal to a pad electrode $2a$. A switch SW1 is provided between the drive circuit 4 and the pad electrode $2a$.

The touch panel also includes readout circuit 5 (self-capacitance measuring circuit, mutual capacitance measuring circuit) for reading out an electric charge signal from the pad electrode $2a$ or a pad electrode $2b$. A switch SW2 is provided between the readout circuit 5 and the pad electrode $2b$. The readout circuit 5 has switch SW3 for resetting an amplifier 20 and an integral capacitor CF.

In the touch panel configured in this manner, first, the pad electrode $2a$ is connected to the drive circuit 4 by the switch SW1. Then, the drive circuit 4 supplies the electrification signal to the pad electrode 2a. Next, the pad electrode 2a is connected to the readout circuit 5 via the switch SW1 and the switch SW2. Thereafter, the readout circuit 5 reads out, from the pad electrode 2a, an electric charge signal based on the self-capacitance between the pad electrode 2a and the touching object 3. In this way, the self-capacitance between the pad electrode 2a and the touching object 3 is measured.

Next, the pad electrode 2a is again connected to the drive circuit 4 by the switch SW1. Then, the drive circuit 4 again supplies the electrification signal to the pad electrode 2a. Thereafter, the pad electrode 2b is connected to the readout circuit 5 by the switch SW2. Then, the readout circuit 5 reads out, from the pad electrode 2b, an electric charge signal based on the mutual capacitance between the pad electrode 2a and the pad electrode 2b. In this way, the mutual capacitance between the pad electrode 2a and the pad electrode 2b is measured.

Figure 3:
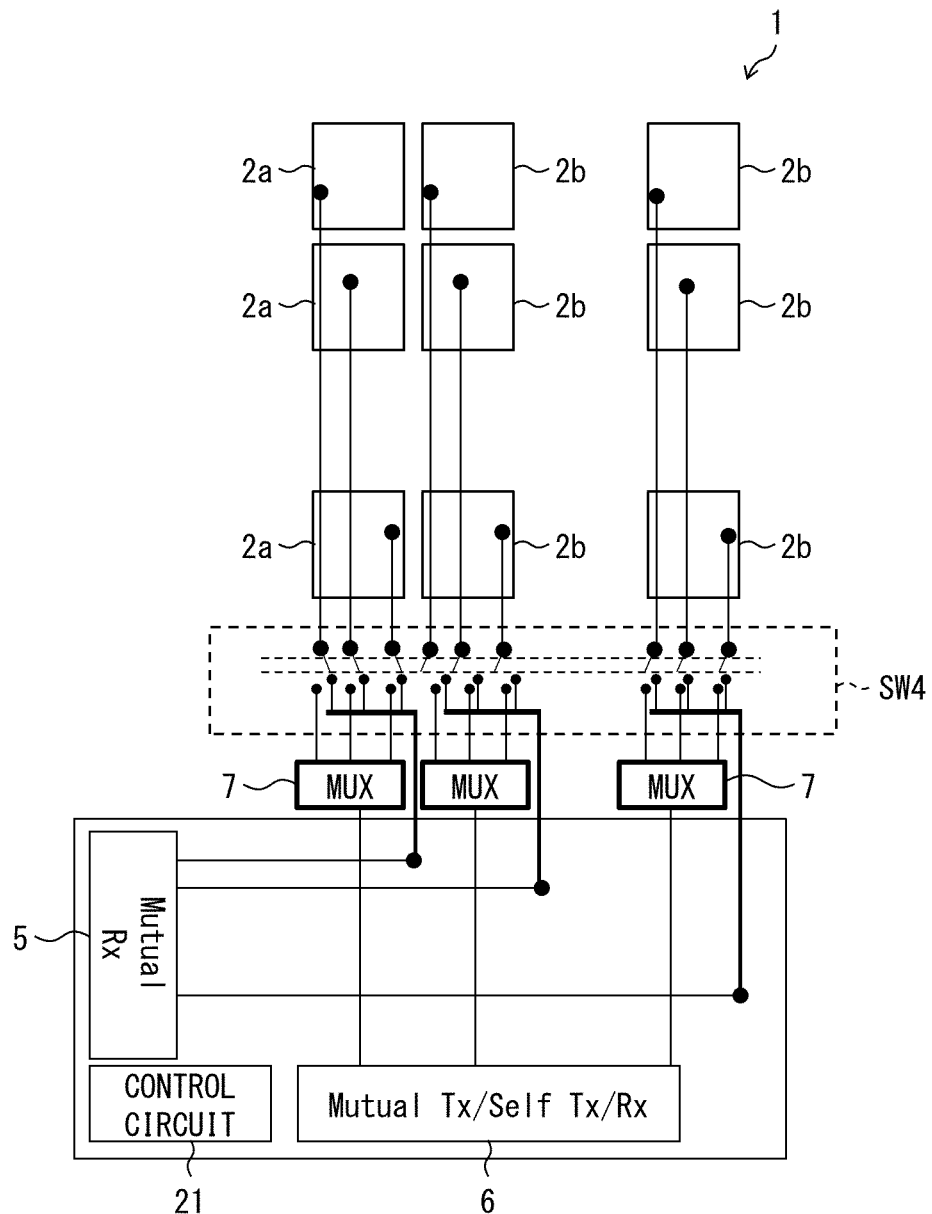
FIG. 3 is a circuit diagram illustrating a configuration of the touch panel.

FIG. 3 is a circuit diagram illustrating a configuration of a touch panel 1 in accordance with Embodiment 1. For convenience, members similar in function to those described above will be given the same reference signs, and their description will be omitted.

The touch panel 1 includes a plurality of pad electrodes 2a/2b which are arranged in the form of a matrix. As illustrated in FIG. 3, pad electrodes 2a are provided in odd number columns, and pad electrodes 2b are provided in even number columns.

The touch panel 1 includes a drive/readout circuit 6 (self-capacitance measuring circuit, mutual capacitance measuring circuit). The drive/readout circuit 6 corresponds to the drive circuit 4 and the readout circuit 5 discussed above with reference to FIG. 2. During a measurement period for the self-capacitance method (during a first measurement period), the drive/readout circuit 6 supplies an electrification signal to each of the pad electrodes 2a and reads out, from each of the pad electrodes 2a, an electric charge signal based on a self-capacitance between (i) each one of the pad electrodes 2a and (ii) the touching object 3. During a measurement period for the mutual capacitance method (during a second measurement period), the drive/readout circuit 6 supplies an electrification signal to each of the pad electrodes 2a.

The touch panel 1 includes a readout circuit 5. During the measurement period for the mutual capacitance method, the readout circuit 5 reads out, from each of the pad electrodes 2b, an electric charge signal based on a mutual capacitance between mutually adjacent ones of the pad electrodes 2a and the pad electrodes 2b.

The touch panel 1 includes a switch SW4 and a plurality of multiplexers 7. The switch SW4 is provided so as to connect the pad electrodes 2a/2b to the drive/readout circuit 6 or the readout circuit 5, as illustrated in FIG. 3.

The switch SW4 is configured to connect the pad electrodes 2a/2b to the readout circuit 5 one row at a time. Each of the plurality of multiplexers 7 is provided so as to connect to pad electrodes 2a or pad electrodes 2b provided in a respective single column, via the switch SW4.

The touch panel 1 includes a control circuit 21 (determining circuit) which (i) determines that the touching object 3 touching the pad electrodes 2a/2b is a conductive object in a case where a mutual capacitance between mutually adjacent ones of the pad electrodes 2a/2b decreases and (ii) determines that the touching object 3 is a non-conductive object in a case where a mutual capacitance between mutually adjacent ones of the pad electrodes 2a/2b increases.

In the touch panel 1 configured in this manner, first, the pad electrodes 2a/2b are connected to respective ones of the multiplexers 7 by the switch SW4. Each multiplexer 7 connects each of the pad electrodes 2a or 2b provided in a respective single column to the drive/readout circuit 6, the pad electrodes 2a or 2b provided in each single column being connected to the drive/readout circuit 6 in sequential order. The drive/readout circuit 6 then supplies, in sequential order to each of the pad electrodes 2a or 2b provided in a single column, an electrification signal via the multiplexers 7 and the switch SW4.

Thereafter, the multiplexers 7 once again connect, in sequential order, each of the pad electrodes 2a or 2b provided in a respective single column to the drive/readout circuit 6. The drive/readout circuit 6 then reads out, in sequential order from each one of the pad electrodes 2a or 2b provided in a single column, an electric charge signal based on a self-capacitance between (i) each pad electrode 2a or 2b and (ii) the touching object 3. This readout is carried out via the multiplexers 7 and the switch SW4. In this way, self-capacitances between the pad electrodes 2a/2b and the touching object 3 are measured.

Next, the pad electrodes 2a are connected to respective ones of the multiplexers 7 by the switch SW4. Each multiplexer 7 connects, in sequential order, each of the pad electrodes 2a provided in a respective single column to the drive/readout circuit 6. The drive/readout circuit 6 then supplies, in sequential order to each of the pad electrodes 2a provided in a single column, an electrification signal via the multiplexers 7 and the switch SW4, the electrification signal being for measuring mutual capacitance. Thereafter, the pad electrodes 2b are connected to the readout circuit 5 by the switch SW4. The readout circuit 5 then reads out, from each of the pad electrodes 2b, an electric charge signal based on the mutual capacitance between mutually adjacent ones of the pad electrodes 2a and the pad electrodes 2b. In this way, mutual capacitances between the pad electrodes 2a and the pad electrodes 2b are measured.

Figure 4:
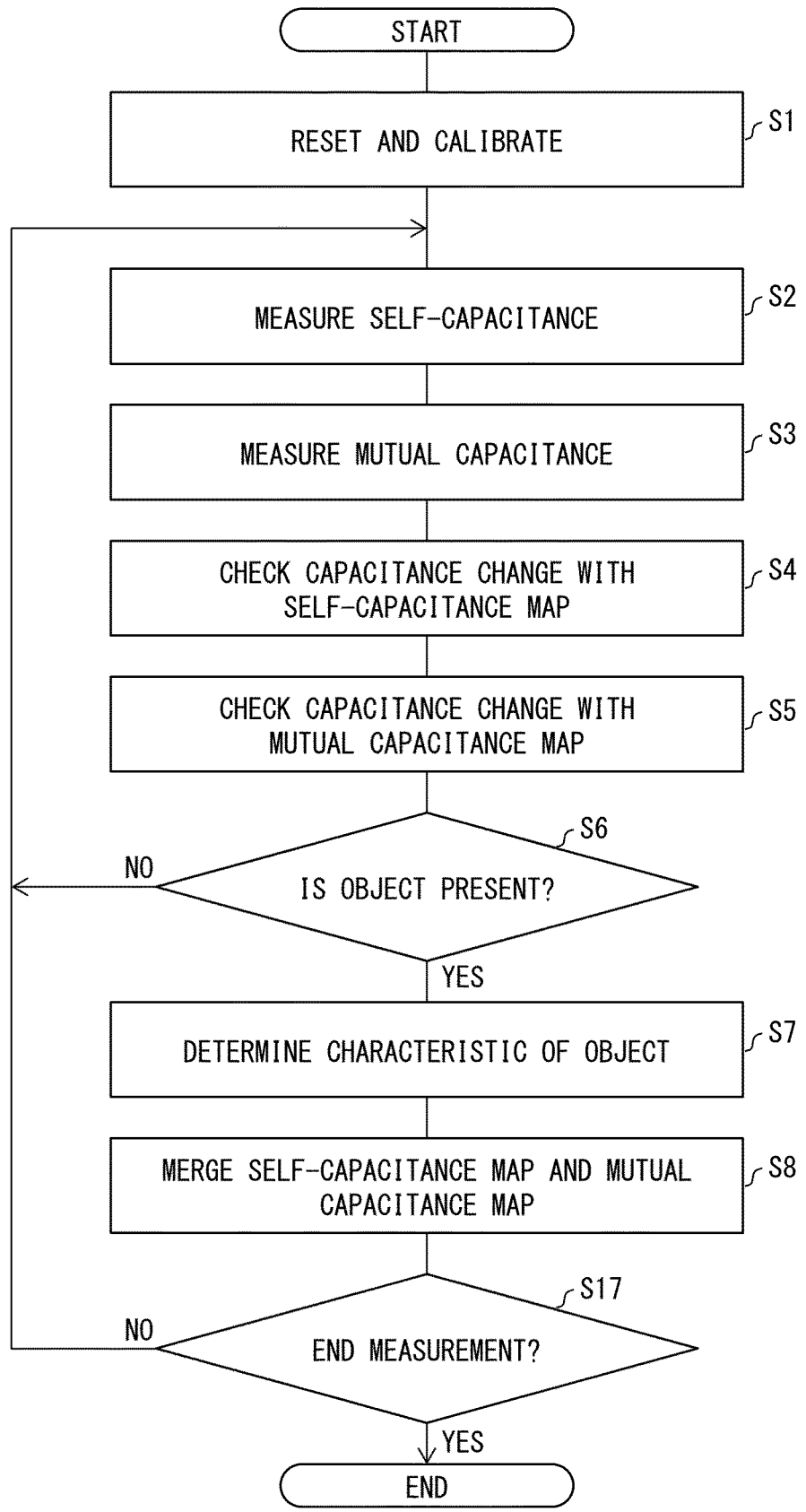
FIG. 4 is a flowchart illustrating a flow of how the touch panel operates.

FIG. 4 is a flowchart illustrating a flow of how the touch panel 1 operates. First, the touch panel 1 is reset and calibrated (step S1). Then, measurements are made using the self-capacitance method (step S2). Next, measurements are made using the mutual capacitance method (step S3).

Thereafter, the control circuit 21 checks changes in the measured self-capacitances in accordance with a self-capacitance map in array form (step S4). Then, the control circuit 21 check changes in the measured mutual capacitances in accordance with a Tx (transmitter) vs. Rx (receiver) mutual capacitance map (step S5).

Next, the control circuit 21 determines, in accordance with the results of checking the changes in self-capacitance, whether or not there is a touching object 3 which is touching the touch panel (step S6). In a case where the control circuit 21 determines that there is no touching object 3 ("No" in step S6), the process returns to step S2.

In a case where the control circuit 21 determines that there is a touching object 3 ("Yes" in step S6), the control circuit 21 identifies the touch location of the touching object 3. Then, the control circuit 21 determines a characteristic of the touching object 3 in accordance with the results of checking the changes in mutual capacitance. For example, in a case where a mutual capacitance between mutually adjacent ones of the pad electrodes 2a/2b decreases, the control circuit 21 determines that the touching object 3 is a conductive object, and in a case where a mutual capacitance between mutually adjacent ones of the pad electrodes 2a/2b increases, the control circuit 21 determines that the touching object 3 is a non-conductive object (step S7).

Examples of the non-conductive object include water. As such, in a case where the control circuit 21 determines that the touching object 3 is water, the control circuit 21 is able to determine that the touch panel is in an environment in which the touch panel gets wet with water. It is possible to configure the control circuit 21 to start up application software related to such an environment in such a case. In this way, it is possible to detect not only the touch location of the touching object 3, but also the surrounding environment of the touch panel.

Thereafter, the control circuit 21 merges the self-capacitance map and the mutual capacitance map (step S8) in order to (i) achieve a favorable signal-to-noise ratio and (ii) assign a touch ID by recording (a) information identifying the touching object 3 (for example, whether the touching object 3 is conductive or non-conductive) and (b) a touch location of the touching object. Then, the control circuit 21 determines whether or not to terminate measurements (step S17). In a case where the control circuit 21 determines that the measurements should not be terminated, the process returns to step S2. In a case where the control circuit 21 determines that the measurements should be terminated, the process ends.

Figure 5:
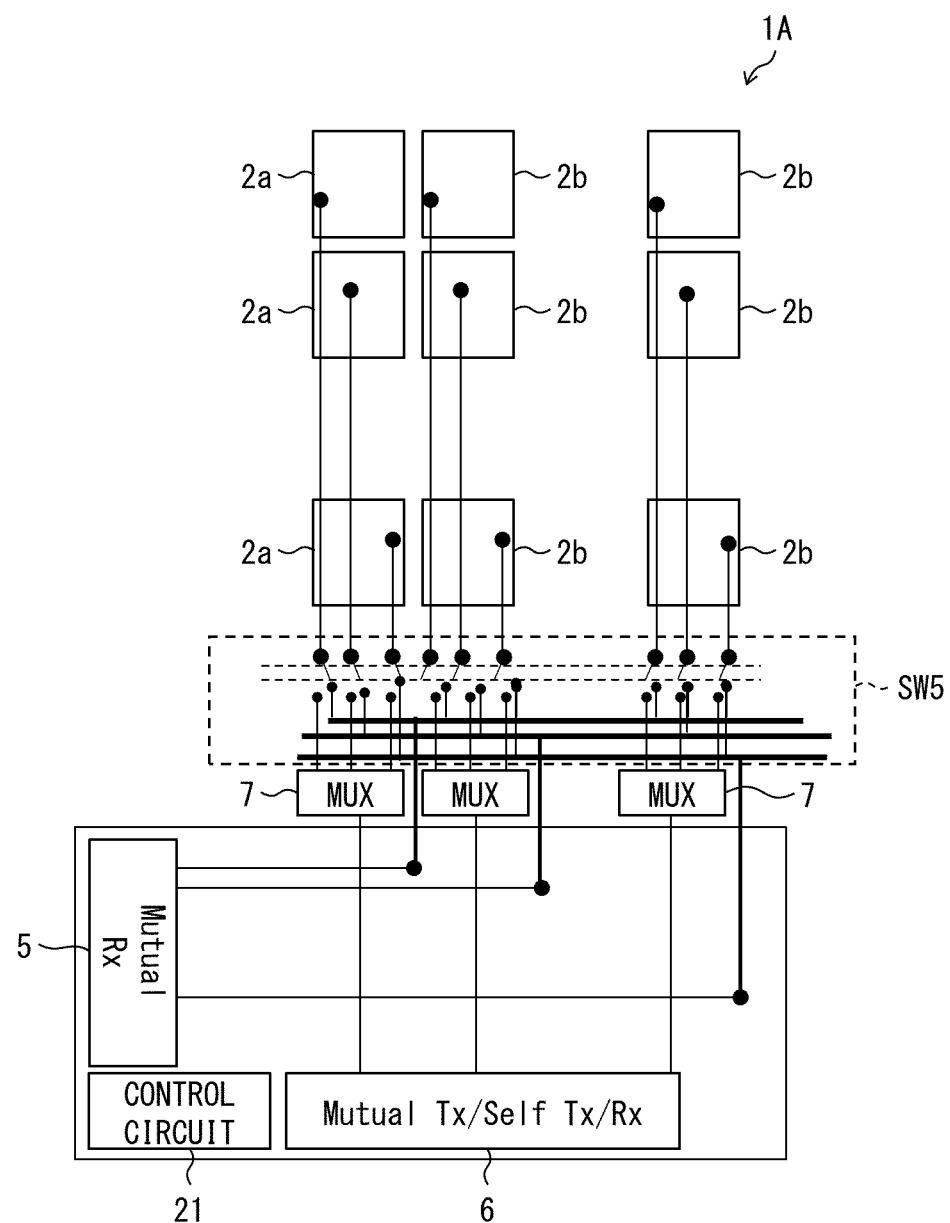
FIG. 5 is a circuit diagram illustrating a variation of the touch panel.

FIG. 5 is a circuit diagram illustrating a variation of the touch panel in accordance with Embodiment 1. Members similar in function to those described above will be given the same reference signs, and their description will be omitted.

A touch panel 1A includes a switch SW5 instead of the switch SW4 discussed above with reference to FIG. 3. The switch SW5 connects the pad electrodes 2a to the drive/readout circuit 6 one row at a time and connects the pad electrodes 2b to the readout circuit 5 one column at a time.

For example, first, the switch SW5 connects pad electrodes 2a in a first row to the drive/readout circuit 6, via the multiplexers 7. The drive/readout circuit 6 then supplies an electrification signal to the pad electrodes 2a in the first row. Next, the switch SW5 connects pad electrodes 2a in a second row to the drive/readout circuit 6, via the multiplexers 7. The drive/readout circuit 6 then supplies the electrification signal to the pad electrodes 2a in the second row. The electrification signal is supplied to the pad electrodes 2a in subsequent rows in the same manner, until the signal is supplied to the pad electrodes 2a in the last row.

Next, the switch SW5 connects each of the pad electrodes 2b in a second column to the readout circuit 5. Then, the readout circuit 5 reads out, from each of the pad electrodes 2b in the second column, an electric charge signal based on an electric charge built up between the pad electrodes 2a in a first column and the pad electrodes 2b in the second column. Next, the switch SW5 connects each of the pad electrodes 2b in a fourth column to the readout circuit 5. Then, the readout circuit 5 reads out, from each of the pad electrodes 2b in the fourth column, an electric charge signal based on an electric charge built up between the pad electrodes 2a in a third column and the pad electrodes 2b in the fourth column. The electric charge signal is read out from each of the pad electrodes 2b in subsequent columns in the same manner, until the signal is read out from each of the pad electrodes 2b in the last column.

In this way, mutual capacitances between mutually adjacent ones of the pad electrodes 2a/2b are measured.

Embodiment 2

The following description will discuss another embodiment of the present invention. For convenience, members similar in function to those described in the foregoing embodiment will be given the same reference signs, and their description will be omitted.

Figure 6:
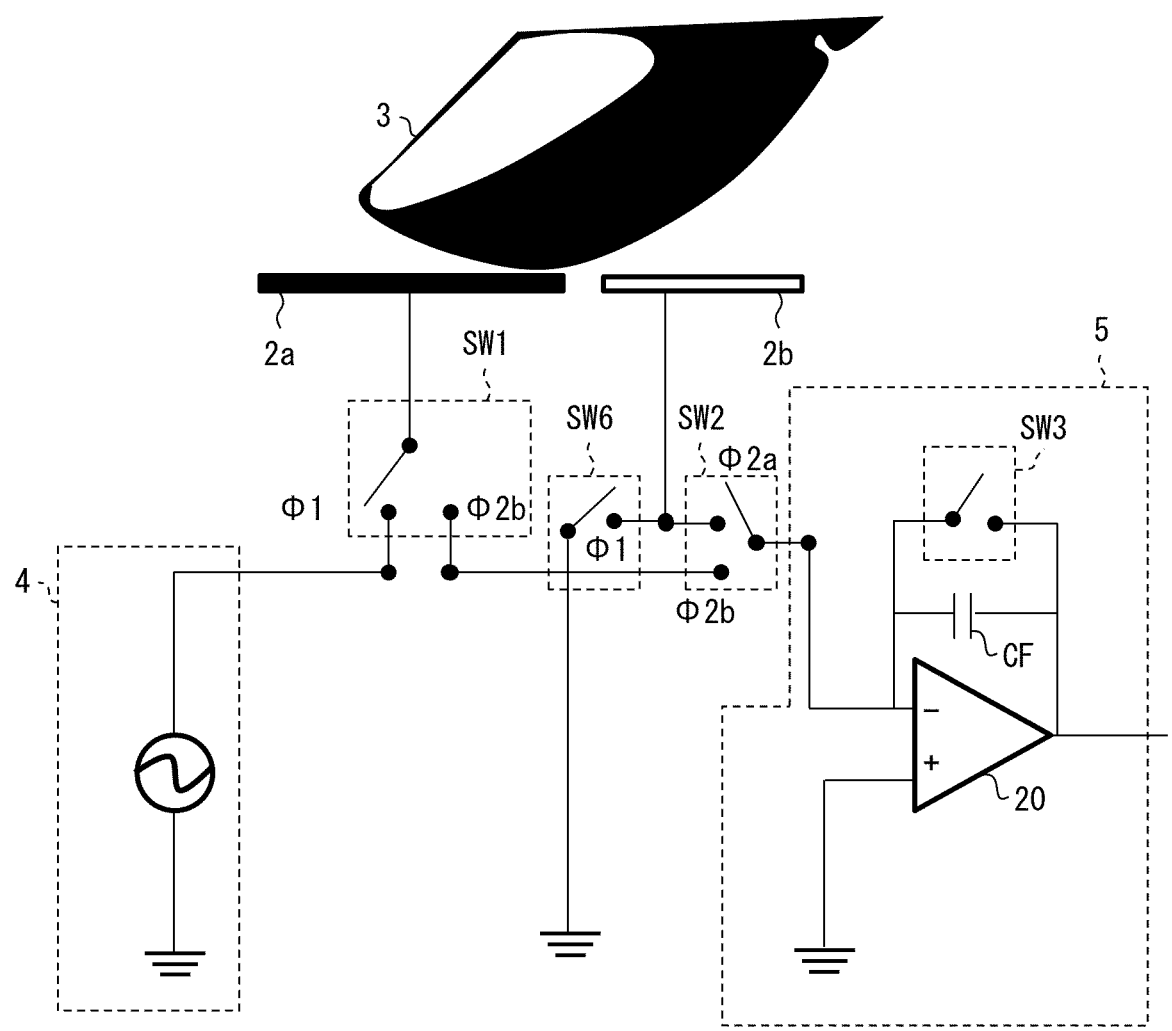
FIG. 6 is a circuit diagram for explaining a method of driving a touch panel in accordance with Embodiment 2.

FIG. 6 is a circuit diagram for explaining a method of driving a touch panel in accordance with Embodiment 2. The circuit shown is obtained by adding a switch SW6 to the circuit described above with reference to FIG. 2.

First, a pad electrode 2a is connected to a drive circuit 4 by a switch SW1, and a pad electrode 2b is connected to a ground by the switch SW6. Then, the drive circuit 4 supplies an electrification signal to the pad electrode 2a.

Thereafter, the pad electrode 2b is connected to a readout circuit 5 by a switch SW2. Then, the readout circuit 5 reads out, from the pad electrode 2b, an electric charge signal based on a self-capacitance between the pad electrode 2b and a touching object 3.

Next, the pad electrode 2a is connected to the readout circuit 5 via the switch SW1 and the switch SW2. Thereafter, the readout circuit 5 reads out, from the pad electrode 2a, an electric charge signal based on a self-capacitance between the pad electrode 2a and the touching object 3. In this way, self-capacitances between the pad electrodes 2a/2b and the touching object 3 are measured.

Figure 7:
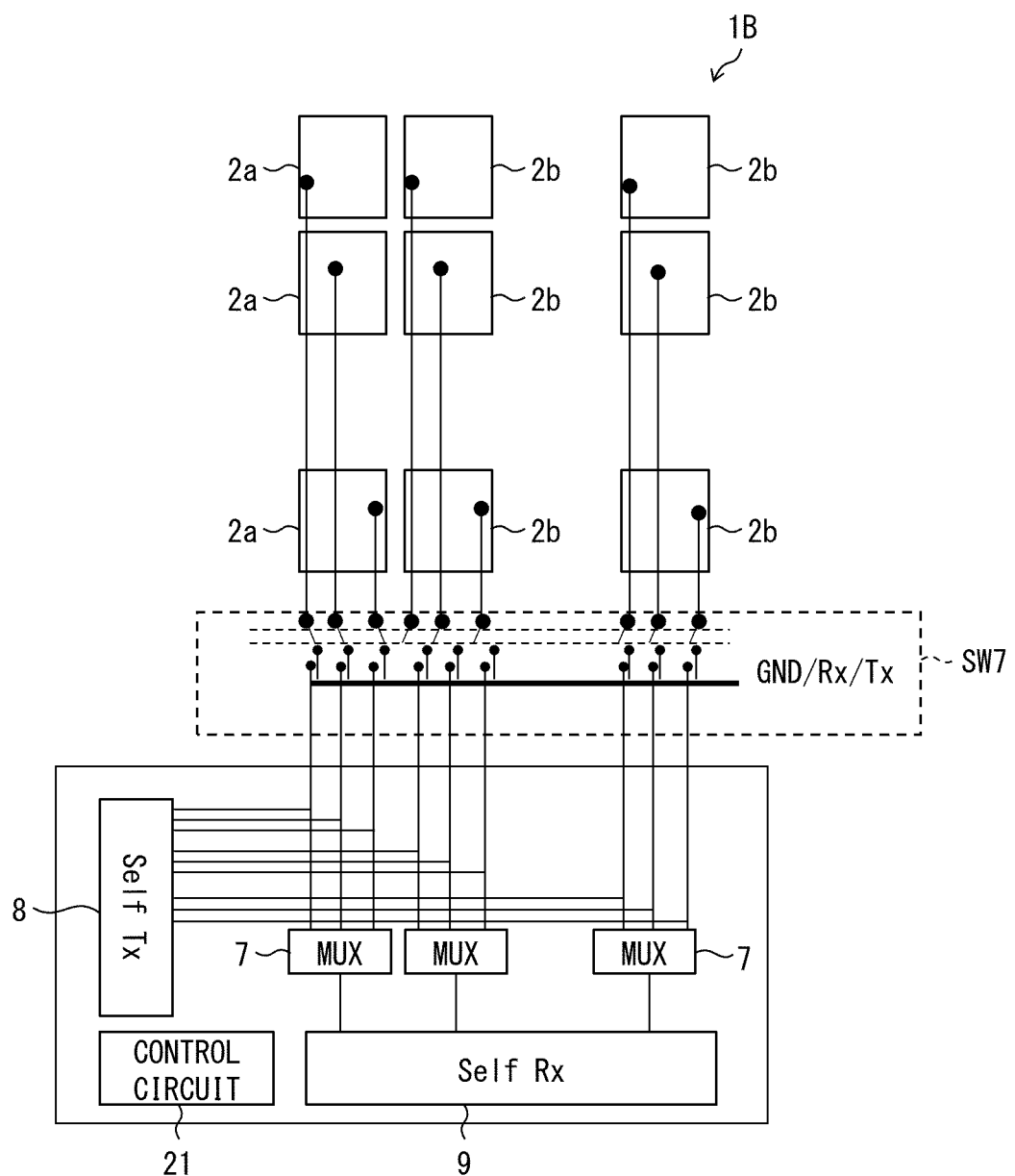
FIG. 7 is a circuit diagram illustrating a configuration of the touch panel.

FIG. 7 is a circuit diagram illustrating a configuration of a touch panel 1B in accordance with Embodiment 2. The touch panel 1B includes a switch SW7 instead of the switch SW4 discussed above with reference to FIG. 3. The touch panel 1B includes a drive circuit 8 for the self-capacitance method and a readout circuit 9 for the self-capacitance method.

In the touch panel 1B configured in this manner, in a first measurement period, first, the switch SW7 connects all of pad electrodes 2a/2b to the drive circuit 8. The drive circuit 8 then supplies a first electrification signal to all of the pad electrodes 2a/2b. Next, the switch SW7 connects the pad electrodes 2a/2b to respective ones of a plurality of multiplexers 7. The readout circuit 9 reads out, via the multiplexers 7, an electric charge signal from the pad electrodes 2a/2b, one row at a time.

Thereafter, in a second measurement period, the switch SW7 once again connects all of the pad electrodes 2a/2b to the drive circuit 8. The drive circuit 8 then supplies the first electrification signal to the pad electrodes 2a and a second electrification signal to the pad electrodes 2b, the second electrification signal having a voltage which differs from that of the first electrification signal. The voltage which differs from that of the first electrification signal may be a ground voltage. Alternatively, the second electrification signal may have a frequency which differs from that of the first electrification signal.

Next, the switch SW7 once again connects the pad electrodes 2a/2b to respective ones of the plurality of multiplexers 7. The readout circuit 9 reads out, via the multiplexers 7, a first electric charge signal from each one of the pad electrodes 2a, and a second electric charge signal from each one of the pad electrodes 2b.

Figure 8:
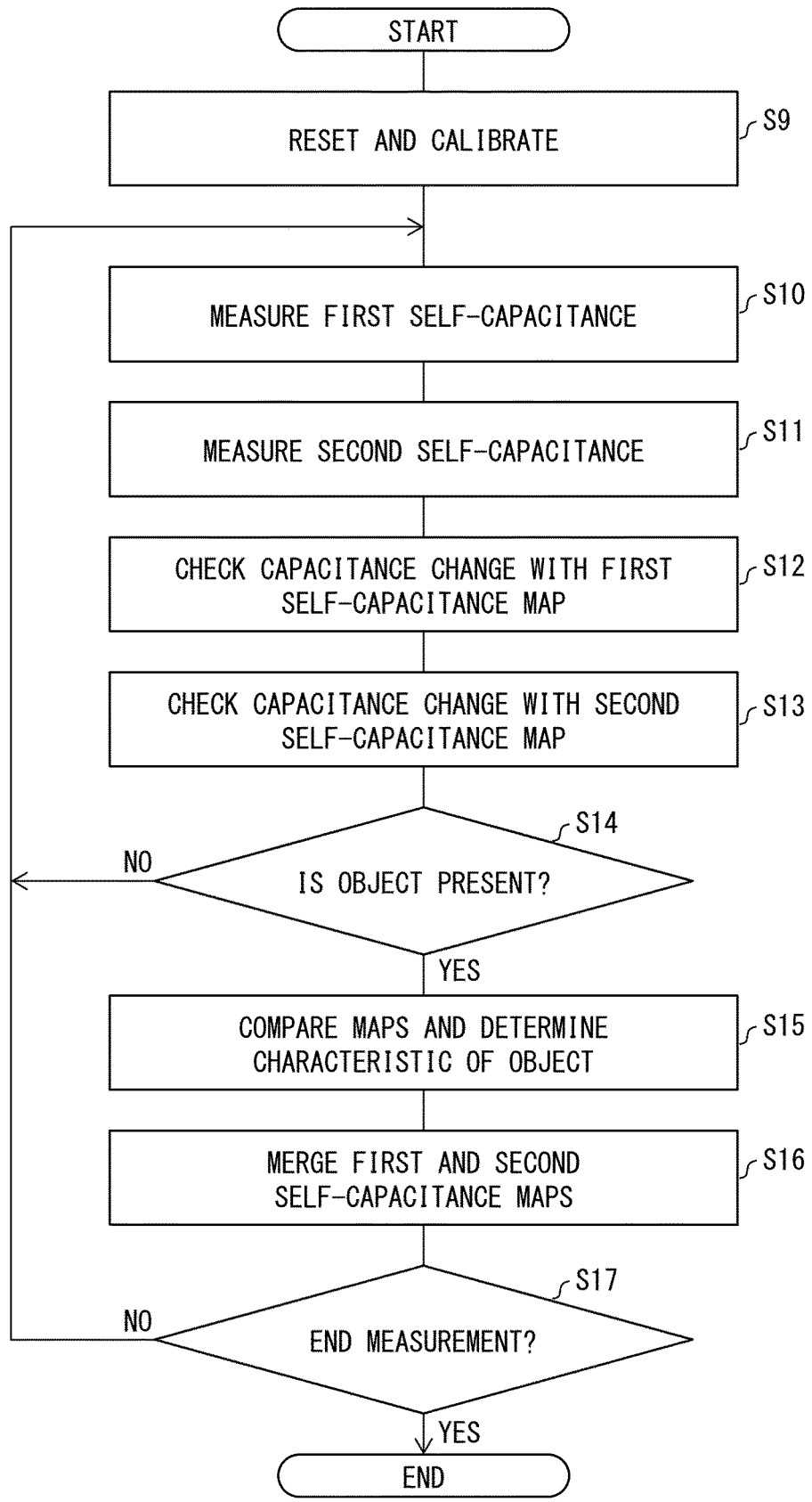
FIG. 8 is a flowchart illustrating a flow of how the touch panel operates.

FIG. 8 is a flowchart illustrating a flow of how the touch panel 1B operates. First, the touch panel 1B is reset and calibrated (step S9). Then, a first self-capacitance is measured (step S10). Next, a second self-capacitance is measured (step S11).

Thereafter, a control circuit 21 checks changes in the measured first self-capacitances in accordance with a first self-capacitance map (step S12). The control circuit 21 then checks changes in the measured second self-capacitances in accordance with a second self-capacitance map (step S13).

Next, the control circuit 21 determines, in accordance with the results of checking the changes in the first self-capacitance, whether or not there is a touching object 3 which is touching the touch panel (step S14). In a case where the control circuit 21 determines that there is no touching object 3 ("No" in step S14), the process returns to step S10.

In a case where the control circuit 21 determines that there is a touching object 3 ("Yes" in step S10), the control circuit 21 compares the first and second self-capacitance maps and determines a characteristic, such as conductivity, of the touching object 3 (step S15).

Thereafter, the control circuit 21 merges the first and second self-capacitance maps (step S16) in order to (i) achieve a favorable signal-to-noise ratio and (ii) assign a touch ID by recording (a) information identifying the touching object 3 (for example, whether the touching object 3 is a conductive or non-conductive) and (b) a touch location of the touching object. Then, the control circuit 21 determines whether or not to terminate measurements (step S17). In a case where the control circuit 21 determines that the measurements should not be terminated, the process returns to step S10. In a case where the control circuit 21 determines that the measurements should be terminated, the process ends.

Figure 9:
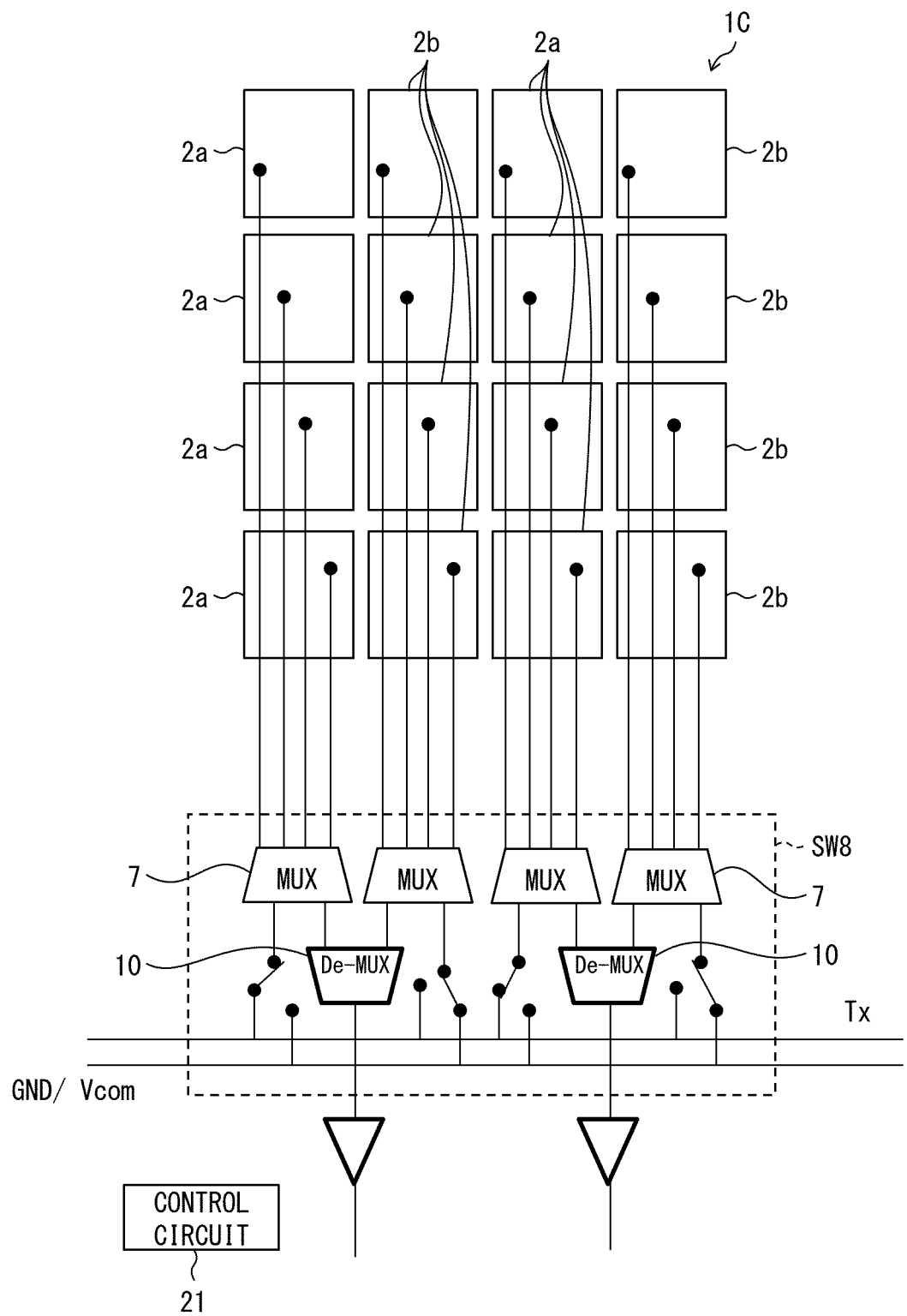
FIG. 9 is a circuit diagram illustrating a variation of the touch panel.

FIG. 9 is a circuit diagram illustrating a variation of the touch panel in accordance with Embodiment 2. The touch panel may include a switch SW8 constituted by multiplexers 7 and demultiplexers 10, as illustrated in FIG. 9.

Figure 10:
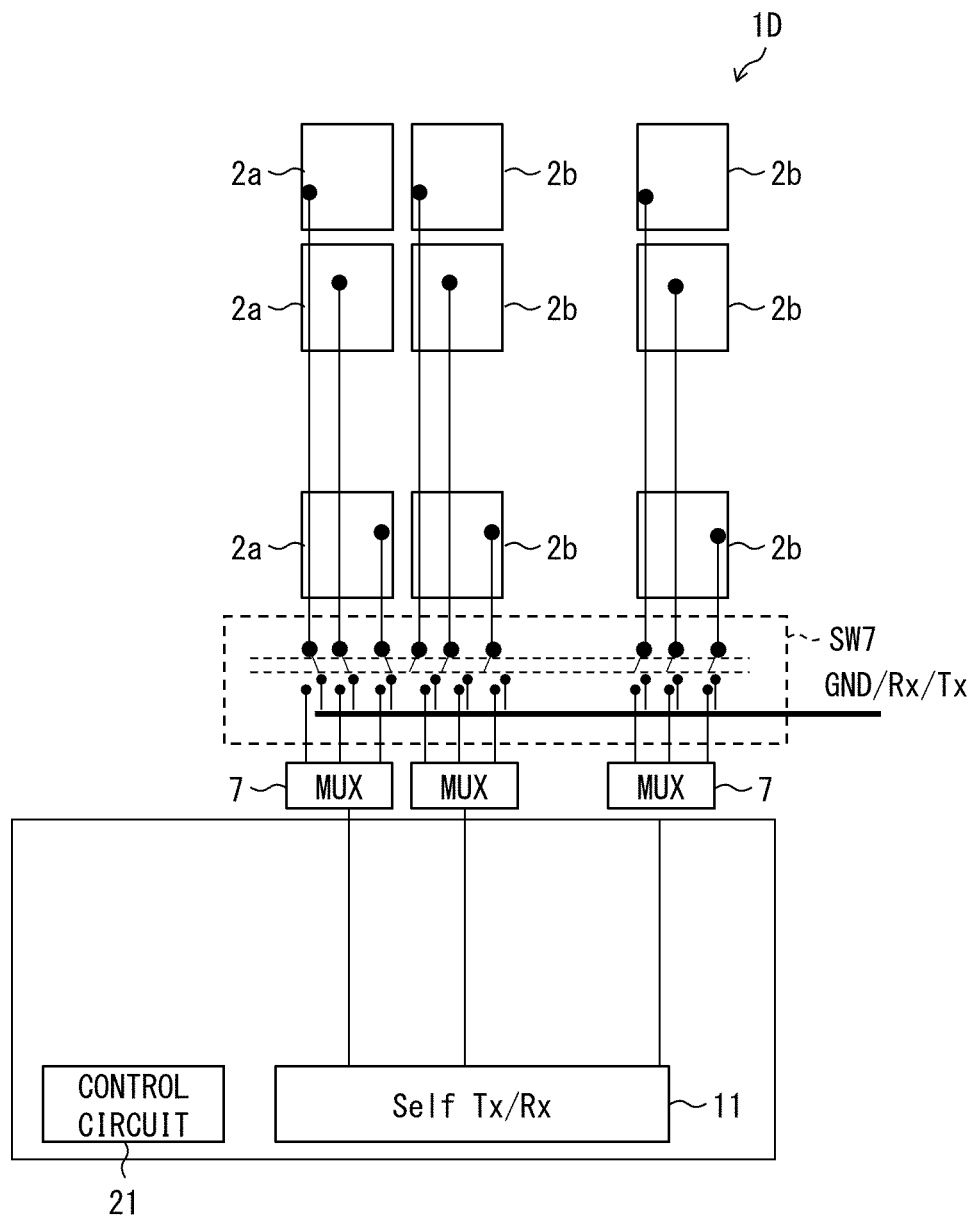
FIG. 10 is a circuit diagram illustrating another variation of the touch panel.

FIG. 10 is a circuit diagram illustrating another variation of the touch panel in accordance with Embodiment 2. The touch panel may include a drive/readout circuit 11 (self-capacitance measuring circuit) instead of (i) the drive circuit 8 illustrated in FIG. 7 and (ii) the readout circuit 9 illustrated in FIG. 7.

Embodiment 3

Figure 11:
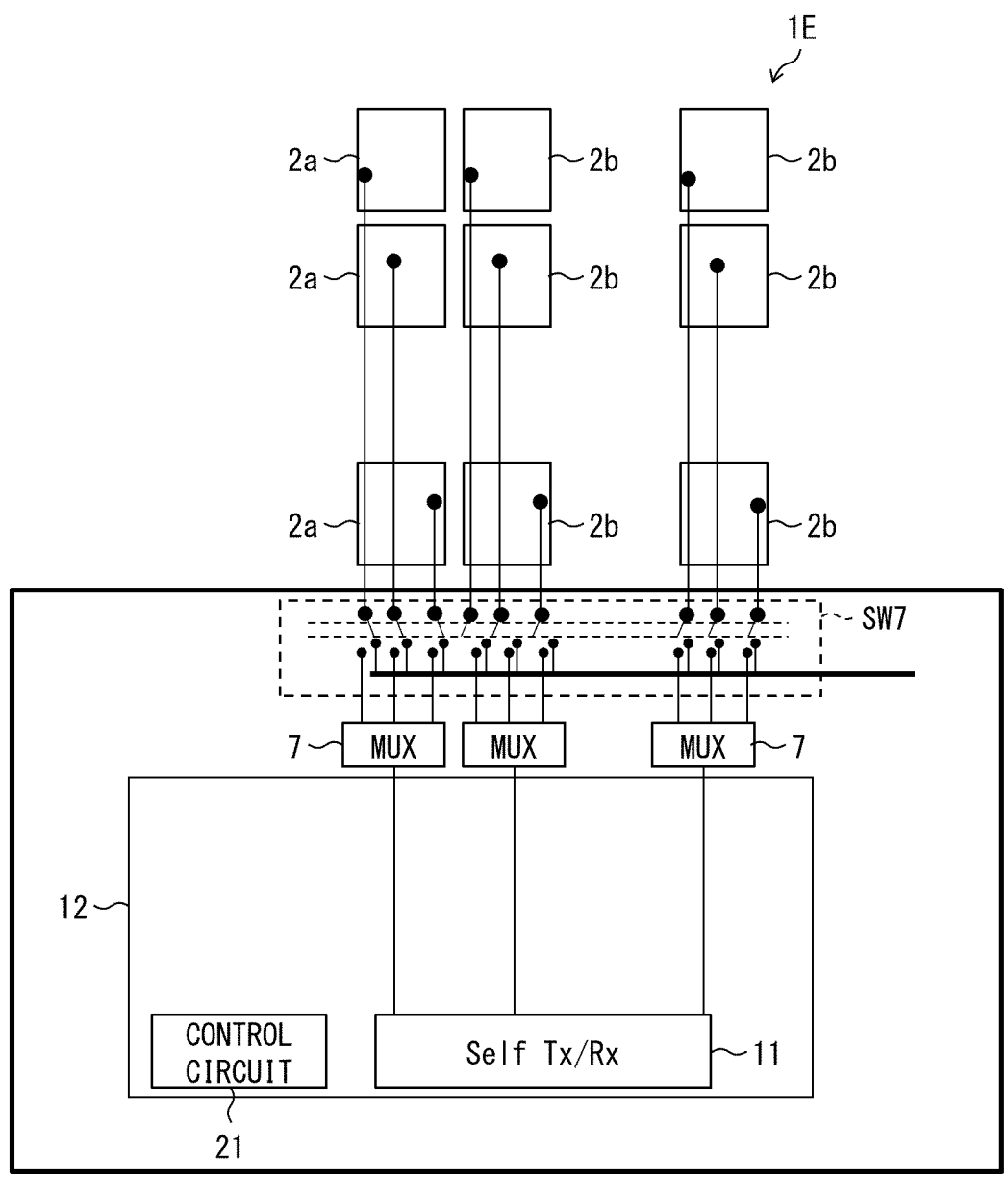
FIG. 11 is a circuit diagram illustrating a configuration of a touch panel in accordance with Embodiment 3.

FIG. 11 is a circuit diagram illustrating a configuration of a touch panel in accordance with Embodiment 3. A touch panel 1E is controlled by a touch panel controller 12. A drive/readout circuit 11 and a control circuit 21 may be integrated into the touch panel controller 12, as illustrated in FIG. 11.

Embodiment 4

(a) of FIG. 12 is a cross-sectional diagram illustrating a touch display 13 in accordance with Embodiment 4. (b) of FIG. 12 is another cross-sectional diagram illustrating the touch display 13.

The touch panels 1 and 1A to 1E in accordance with the preceding embodiments each may be an in-cell type touch panel which is integrated into the touch display 13. The touch display 13 includes a thin film transistor (TFT) glass substrate 11. Display TFTs 15 are formed on the TFT glass substrate 11. A display pixel electrode 16 is formed above each display TFT 15. Common electrodes 17 (Vcom electrodes) are formed above the display pixel electrodes 16. The common electrodes 17 are for forming an electric field which controls the orientation of liquid crystal molecules. The common electrodes 17 constitute pad electrodes 2a/2b of the touch panel 1 integrated into the touch display 13. The pad electrodes 2a/2b of the common electrode 17 are connected to one of the previously described switches SW1 to SW7.

Some of the display TFTs 15 can be used as switch TFTs 19 which constitute the one of the switches SW1 to SW7 for switching between the self-capacitance method and the mutual capacitance method. In such a case, the pad electrodes 2a/2b are connected to the switch TFTs 19.

[Recap]

A touch panel 1 in accordance with Aspect 1 of the present invention includes: a plurality of pad electrodes 2a/2b arranged in the form of a matrix; a self-capacitance measuring circuit (drive/readout circuit 6) which measures, during a first measurement period, a self-capacitance between each of the plurality of pad electrodes 2a/2b and a touching object 3, in order to detect a touch location at which the touching object 3 is touching one or more of the plurality of pad electrodes 2a/2b; and a mutual capacitance measuring circuit (readout circuit 5, drive/readout circuit 6) which measures, during a second measurement period, a mutual capacitance between a first portion of the plurality of pad electrodes 2a/2b and a second portion of the plurality of pad electrodes 2a/2b, in order to determine at least one characteristic of the touching object 3 which is touching one or more of the plurality of pad electrodes 2a/2b.

With the above configuration, a mutual capacitance between a first portion and a second portion of the plurality of pad electrodes is measured. The mutual capacitance increases or decreases in accordance with characteristics of the touching object. As such, the above configuration makes it possible to obtain a touch panel which can determine a characteristic of the touching object.

In Aspect 2 of the present invention, the touch panel 1 in accordance with Aspect 1 can be arranged such that the mutual capacitance measuring circuit (readout circuit 5, drive/readout circuit 6) includes: a drive circuit (drive/readout circuit 6) which supplies an electrification signal to the first portion of the plurality of pad electrodes 2a/2b in order to build up an electric charge between the first portion and the second portion of the plurality of pad electrodes 2a/2b; and a readout circuit 5 which reads out, from the second portion of the plurality of pad electrodes 2a/2b, an electric charge signal based on the electric charge built up between the first portion and the second portion of the plurality of pad electrodes 2a/2b.

The above configuration makes it possible to read out a mutual capacitance between mutually adjacent pad electrodes.

In Aspect 3 of the present invention, the touch panel 1 in accordance with Aspect 1 can be arranged such that: the first portion of the plurality of pad electrodes 2a/2b consists of pad electrodes 2a provided in an odd number column, and the second portion of the plurality of pad electrodes 2a/2b consists of pad electrodes 2b provided in an even number column.

The above configuration makes it possible to read out a mutual capacitance between (i) pad electrodes provided in an odd number column and (ii) pad electrodes provided in an even number column.

In Aspect 4 of the present invention, the touch panel 1 in accordance with Aspect 1 can be arranged such that the at least one characteristic of the touching object 3 includes conductivity of the touching object 3.

The above configuration makes it possible to determine whether the touching object is a conductive object or a non-conductive object.

In Aspect 5 of the present invention, the touch panel 1 in accordance with Aspect 1 can be arranged such that the mutual capacitance measuring circuit (readout circuit 5, drive/readout circuit 6) includes a determining circuit (control circuit 21) which (i) determines that the touching object 3 touching one or more of the plurality of pad electrodes 2a/2b is a conductive object in a case where a mutual capacitance between the first portion and the second portion of the plurality of pad electrodes 2a/2b decreases and (ii) determines that the touching object 3 is a non-conductive object in a case where a mutual capacitance between the first portion and the second portion of the plurality of pad electrodes 2a/2b increases.

The above configuration makes it possible to determine the conductivity of the touching object based on the results of measuring an increase or decrease in mutual capacitance between pad electrodes.

A touch panel 1B in accordance with Aspect 6 of the present invention includes: a plurality of pad electrodes 2a/2b arranged in the form of a matrix; and a self-capacitance measuring circuit (drive circuit 8, readout circuit 9) which measures, during a first measurement period and a second measurement period, a self-capacitance between each of the plurality of pad electrodes 2a/2b and a touching object 3, in order to detect a touch location at which the touching object 3 is touching one or more of the plurality of pad electrodes 2a/2b, the self-capacitance measuring circuit (drive circuit 8, readout circuit 9) including: a drive circuit 8 which supplies, during the first measurement period, a first electrification signal to each of the plurality of pad electrodes 2a/2b; and a readout circuit 9 which reads out, during the first measurement period, a first electric charge signal from each of the plurality of pad electrodes to which the first electrification signal has been supplied by the drive circuit 8, the drive circuit 8 supplying, during the second measurement period, (i) the first electrification signal to a first portion of the plurality of pad electrodes 2a/2b and (ii) a second electrification signal to a second portion of the plurality of pad electrodes 2a/2b which is adjacent to the first portion of the plurality of pad electrodes 2a/2b, the second electrification signal having a voltage which differs from that of the first electrification signal, the readout circuit 9 reading out, during the second measurement period, (i) the first electric charge signal from the first portion of the plurality of pad electrodes 2a/2b to which the first electrification signal has been supplied and (ii) a second electric charge signal from the second portion of the plurality of pad electrodes 2a/2b to which the second electrification signal has been supplied.

With the above configuration, the following capacitances change in accordance with a characteristic of the touching object: a first self-capacitance in accordance with the first electric charge signal read out from the pad electrodes to which the first electrification signal has been supplied; and a second self-capacitance in accordance with the second electric charge signal read out from the pad electrodes to which the second electrification signal has been supplied, the second electrification signal having a voltage differing from that of the first electrification signal. As such, the above configuration makes it possible to obtain a touch panel which can determine a characteristic of the touching object.

A touch panel controller in accordance with Aspect 7 of the present invention is a touch panel controller which controls a touch panel including a plurality of pad electrodes arranged in the form of a matrix, the touch panel controller including: a self-capacitance measuring circuit which measures, during a first measurement period, a self-capacitance between each of the plurality of pad electrodes and a touching object, in order to detect a touch location at which the touching object is touching one or more of the plurality of pad electrodes; and a mutual capacitance measuring circuit which measures, during a second measurement period, a mutual capacitance between a first portion of the plurality of pad electrodes and a second portion of the plurality of pad electrodes, in order to determine at least one characteristic of the touching object which is touching one or more of the plurality of pad electrodes.

A touch panel controller in accordance with Aspect 8 of the present invention is a touch panel controller which controls a touch panel including a plurality of pad electrodes arranged in the form of a matrix, the touch panel controller including: a self-capacitance measuring circuit which measures, during a first measurement period and a second measurement period, a self-capacitance between each of the plurality of pad electrodes and a touching object, in order to detect a touch location at which the touching object is touching one or more of the plurality of pad electrodes, the self-capacitance measuring circuit including: a drive circuit which supplies, during the first measurement period, a first electrification signal to each of the plurality of pad electrodes; and a readout circuit which reads out, during the first measurement period, a first electric charge signal from each of the plurality of pad electrodes to which the first electrification signal has been supplied by the drive circuit, the drive circuit supplying, during the second measurement period, (i) the first electrification signal to a first portion of the plurality of pad electrodes and (ii) a second electrification signal to a second portion of the plurality of pad electrodes which is adjacent to the first portion of the plurality of pad electrodes, the second electrification signal having a voltage which differs from that of the first electrification signal, the readout circuit reading out, during the second measurement period, (i) the first electric charge signal from the first portion of the plurality of pad electrodes to which the first electrification signal has been supplied and (ii) a second electric charge signal from the second portion of the plurality of pad electrodes to which the second electrification signal has been supplied.

A touch display in accordance with Aspect 9 of the present invention includes a touch panel described in Aspect 1 or 6.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 Touch panel
2a Pad electrode
2b Pad electrode
3 Touching object
4 Drive circuit (self-capacitance measuring circuit, mutual capacitance measuring circuit)
5 Readout circuit (self-capacitance measuring circuit, mutual capacitance measuring circuit)
6 Drive/readout circuit (self-capacitance measuring circuit, mutual capacitance measuring circuit)
7 Multiplexer
8 Drive circuit (self-capacitance measuring circuit)
9 Readout circuit (self-capacitance measuring circuit)
10 Demultiplexer
11 Drive/readout circuit (self-capacitance measuring circuit)
12 Touch panel controller
13 Touch display
21 Control circuit (determining circuit)
SW1 to SW9 Switch CS Self-capacitance
CM Mutual capacitance

The invention claimed is:

1. A touch panel comprising:
a plurality of pad electrodes arranged in a matrix;
a switch connected to the plurality of pad electrodes;
a drive/readout circuit connected to the switch; and
a readout circuit connected to the switch, wherein:
a first portion of the plurality of pad electrodes includes pad electrodes provided in an odd number column of the matrix;
a second portion of the plurality of pad electrodes includes pad electrodes provided in an even number column of the matrix;
the drive/readout circuit is configured such that: during a first measurement period, in order to measure a self-capacitance between each of the plurality of pad electrodes and a touching object and detect a touch location at which the touching object is touching one or more of the plurality of pad electrodes, the drive/readout circuit supplies an electrification signal to the plurality of pad electrodes and reads out, from the plurality of pad electrodes, an electric charge signal based on the self-capacitance between each of the plurality of pad electrodes and the touching objects; and during a second measurement period, in order to measure a mutual capacitance between a first portion of the plurality of pad electrodes and a second portion of the plurality of pad electrodes and determine conductivity of the touching object which is touching one or more of the plurality of pad electrodes, the drive/readout circuit supplies an electrification signal to the first portion of the plurality of pad electrodes in order to build up an electric charge between the first portion of the plurality of pad electrodes and the second portion of the plurality of pad electrodes;
the readout circuit is configured such that, during the second measurement period, the readout circuit reads out, from the second portion of the plurality of pad electrodes, an electric charge signal based on the electric charge built up between the first portion of the plurality of pad electrodes and the second portion of the plurality of pad electrodes; and
the switch is configured such that (i) during the first measurement period, the switch connects the plurality of pad electrodes to the drive/readout circuit and (ii) during the second measurement period, the switch connects the plurality of pad electrodes to the drive/readout circuit and, after the drive/readout circuit has supplied the electrification signal to the first portion of the plurality of pad electrodes, disconnects the plurality of pad electrodes from the drive/readout circuit and connects the plurality of pad electrodes to the readout circuit.

2. The touch panel according to claim 1, further comprising a determining circuit which (i) determines that the touching object touching one or more of the plurality of pad electrodes is a conductive object in a case where the mutual capacitance between the first portion and the second portion of the plurality of pad electrodes decreases and (ii) determines that the touching object is a non-conductive object in a case where the mutual capacitance between the first portion and the second portion of the plurality of pad electrodes increases.

3. A touch display comprising the touch panel recited in claim 1.

* * * * *